United States Patent
Mort

[19]

[11] Patent Number: 5,599,083
[45] Date of Patent: Feb. 4, 1997

[54] PROJECTION APPARATUS

[76] Inventor: Christopher H. J. Mort, 1A Goetre Fawr Road, Swansea, United Kingdom, SA2 7QS

[21] Appl. No.: 357,109

[22] Filed: Dec. 16, 1994

[51] Int. Cl.[6] .................................................. G03B 21/14
[52] U.S. Cl. ................................................................ 353/69
[58] Field of Search ................................. 353/69, 70, 101

[56] References Cited

U.S. PATENT DOCUMENTS

| 4,002,408 | 1/1977 | Amma | 353/70 |
|---|---|---|---|
| 5,355,188 | 10/1994 | Biles | 353/69 |
| 5,414,480 | 5/1995 | Morizumi | 353/070 |

FOREIGN PATENT DOCUMENTS

| 3335143 | 4/1984 | Germany . | |
| 3512465 | 10/1986 | Germany . | |
| 6307378 | 4/1988 | Japan . | |
| 2003085 | 1/1990 | Japan . | |
| 0113432 | 5/1991 | Japan | 353/69 |

*Primary Examiner*—William Dowling
*Attorney, Agent, or Firm*—Cumpston & Shaw

[57] ABSTRACT

Projection apparatus comprises a projection lens arranged to project an image from the apparatus and an image carrier (such as an L.C.D. array, film or slide) which is retained in the apparatus in such a way so as to be tiltable about a pivot axis. Because the image carrier is tillable, "keystone effect" typical of projected images may be reduced or substantially prevented. The projection lens is preferably tiltable also and coupled to the tilting of the image carrier to reduce further "keystone effect" and improve image resolution.

10 Claims, 5 Drawing Sheets

PROJECTION APPARATUS

The present invention is concerned with projection apparatus.

According to the present invention, there is provided projection apparatus comprising a projection lens arranged to project an image from the apparatus and means for retaining an image carrier element spaced from the projection lens means, wherein means is provided for tilting the image carrier element about a respective pivot axis.

It is preferred that the image carrier is arranged to be tilted in the direction of light travel through the image carrier, preferably toward the projection lens.

It is greatly preferred that the projection lens is also arranged to be tilted, advantageously by an angular extent proportional to the degree of tilting of the image carrier element. Desirably, the projection lens is arranged to be tilted by the same angular extent as the image carrier element.

Typically a field lens is provided to direct light from a source through the image carrier element toward the projection lens. Desirably the field lens comprises a Fresnel lens. It is preferred that the projection lens and image carrier element are tiltable about their respective axes relative to the field lens.

Desirably, the pivot axes of the image carrier element and the projection lens are fixed relative to one another and preferably also fixed relative to the remainder of the apparatus.

It is preferred that the pivot axes of the image carrier element and the projection lens are arranged such that the optically transmissive portions of the image carrier element and projection lens are not intersected by their respective pivot axes. In other words, it is preferred that the projection lens and the image carrier element are edge pivoted.

Desirably, the pivot axes are arranged such that all the optically transmissive portions of the projection lens and image carrier element (i.e. those portions through which it is intended light should pass) are arranged to be tilted in the same direction, preferably in the direction of light propagation through the apparatus.

It is preferred that the projection lens and image carrier element are coupled relative to one another such that tilting angular movement of one causes corresponding tilting angular movement of the other by substantially the same angular degree. Desirably a mechanical linkage mechanism is provided for coupling the image carrier element and projection lens, although alternatively electronic or electromechanical control means may be used.

It is preferred that an actuator is provided preferably being selectively actuable to cause tilting of the image carrier element and projection lens preferably simultaneously. Desirably, the actuator causes tilting of the image carrier element and projection via the linkage mechanism.

The image carrier element may comprise a film, acetate or other transparency. Alternatively, or in addition, the image carrier element may comprise a liquid crystal display (LCD) array.

It is preferred that the actuator is provided to tilt the image carrier element about its respective pivot axis automatically in response to the apparatus being orientated at a correspondingly inclined attitude relative to a datum or a reference plane or axis. Preferably, the actuation means comprises a linkage mechanism arranged to cause tilting of the image carrier element by a predetermined extent when the apparatus is itself arranged in a tilted position relative to a datum support surface. Preferably, the projection lens also tilts automatically in unison with the image carrier element. Desirably, the optical components of the projection apparatus are provided in a housing tiltable relative to a datum mount or base, the actuator comprising a linkage mechanism connected to the datum mount or base means and arranged to cause the required tilting of the image carrier element and preferably the projection lens.

The invention will now be further described in a specific embodiment by way of example only and with reference to the accompanying drawings, in which.

Figure 1:
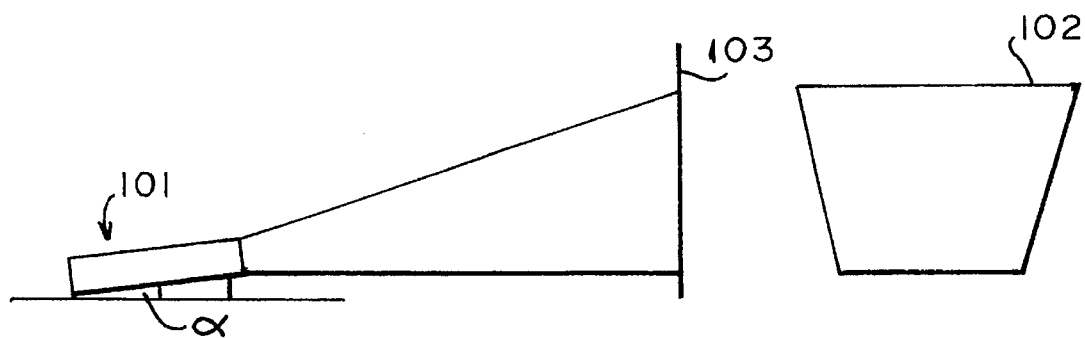
FIG. 1 is a schematic representation of prior art projection apparatus.

Referring to the drawings and initially to FIG. 1, there is shown prior art projection apparatus 101 capable of projecting an image 102 onto a screen 103. Because the projector is inclined at angle α to the horizontal, there is a difference in the length of projection to the screen between and upper and lowermost portions of the image which results in a common phenomenon of a "keystone" or trapezoidal image 102 on screen 103.

Figure 2:
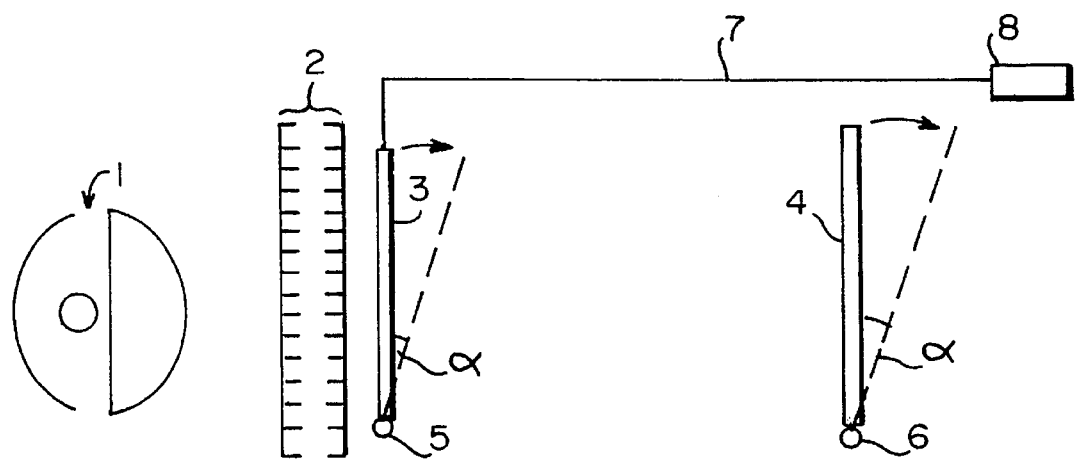
FIG. 2 is a schematic side elevation of an exemplary embodiment of projection apparatus according to the invention.

Referring now to FIG. 2, there is shown projection apparatus according to the invention. The apparatus comprises a light source 1 such as an arc lamp or a filament lamp or any other source of illumination suitable for a projector, and arranged along a light path from the light source 1, a Fresnel or conventional glass or plastic curved surface lens or field lens arrangement 2, an image carrier element 3, which may typically be a reflective or transmissive LCD array, acetate transparency or other partially transparent film or slide or other medium for modulating visible information on a light beam, and a projection lens 4.

The image carrier element 3 and projection lens 4 are arranged such that their normal axes (not shown) are substantially parallel to one another and pivotally mounted at respective fixed pivot points 5, 6 positioned at respective edges thereof. The image carrier element 3 and field lens 4 are arranged to be pivotally movable by the operation of a linkage mechanism 7 actuated by an actuation member 8. The linkage mechanism is arranged to pivotally tilt the image carrier element 3 and projection lens 4 such that as one pivots through an angle α the other also pivots through the same angle α. The linkage mechanism 7 therefore ensures that the normals to the image carrier element 3 and the projection lens 4 remain substantially parallel to one another. Other mechanisms for pivoting the image carrier and field lens such as a hinge, resilient mount or the like may also be used.

It is preferred that the pivotal axes of pivots 5, 6 are substantially parallel to one another and provided along respective edges of the image carrier element 3 and projection lens 4 respectively. This ensures that when image carrier element 3 and projection lens 4 pivot in unison under the influence of the linkage mechanism 7, all points of the carrier element 3 and projection lens 4 on the optical path through the apparatus are displaced away from and not toward the light source 1.

The apparatus therefore ensures that, because the image carrier element 3 is pivotally displaceable away from the light source, the trapezoidal effect typically produced by prior art projection apparatus may be compensated for and a substantially rectangular image is produced on a screen. By coupling the projection lens 4 to tilt in unison with the image carrier element, (by means of linkage mechanism 7), a higher resolution, more in focus image is produced.

Figure 3:
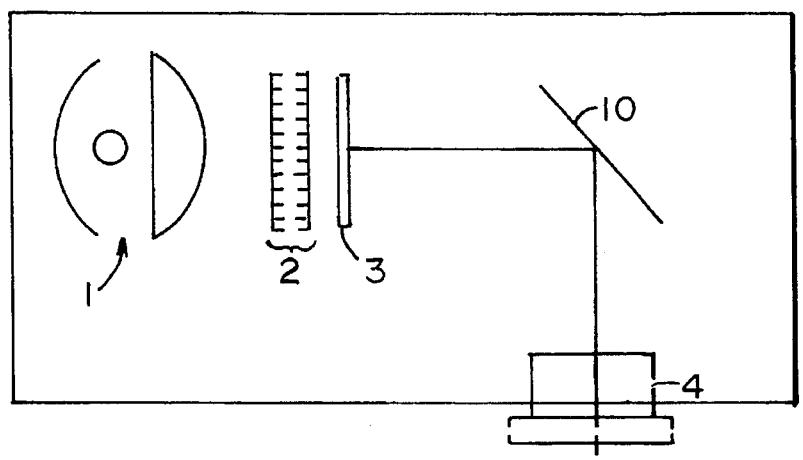
FIG. 3 is a schematic plan view of an alternative exemplary embodiment of projection apparatus according to the invention.

Referring now to FIG. 3, there is shown an alternative arrangement of projection apparatus which is generally similar to that shown in FIG. 2 but where the light path is folded or bent through 90° (by means of a mirror or prism 10) prior to passing through the projector lens 4. In this embodiment, as for the embodiment shown in FIG. 2, the image carrier element 3 and the projection lens 4 are both pivoted along their bottom edges.

Figure 4:
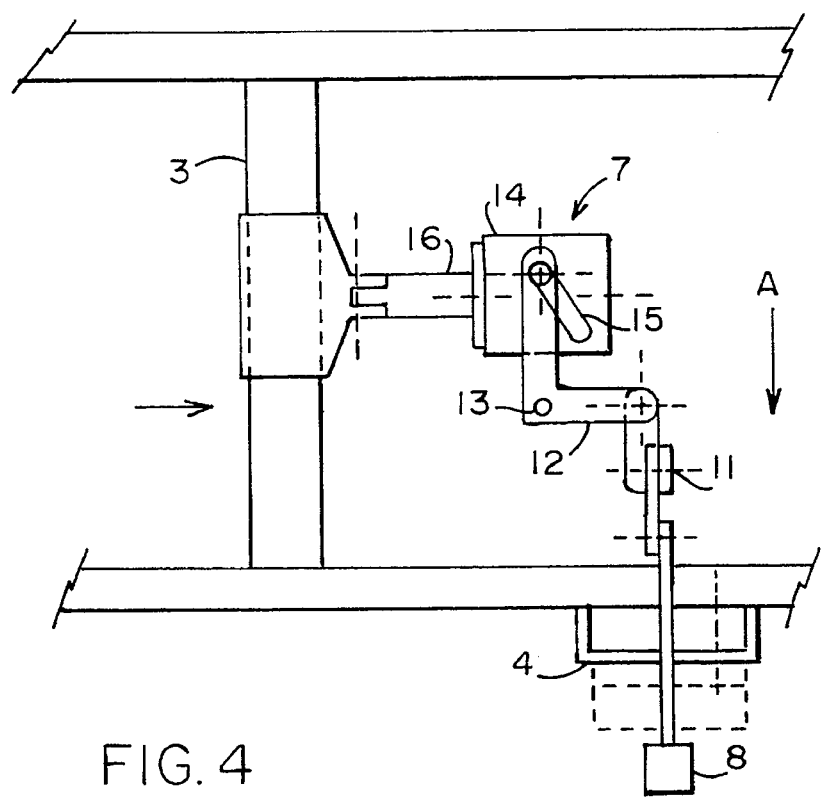
FIGS. 4 and 5 are schematic plan views of actuator mechanisms for use with the embodiment of projection apparatus shown in FIG. 3.
Figure 5:
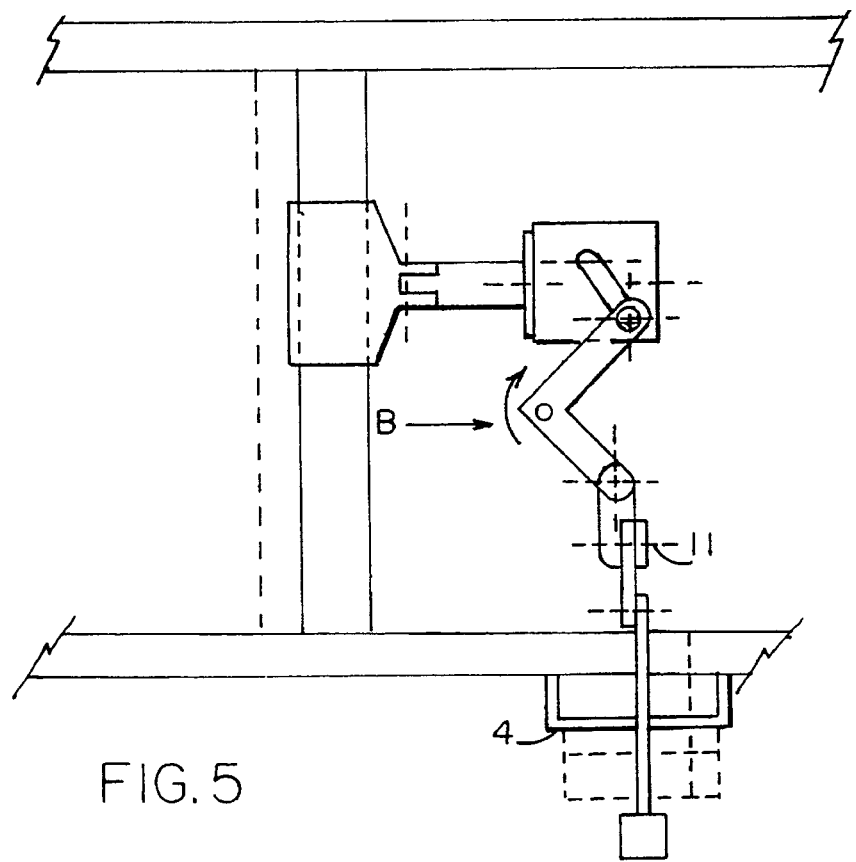

Referring to FIGS. 4 and 5, there is shown a linkage mechanism 7 suitable for use in simultaneously pivoting image carrier element 3 and projection lens 4 through the same angular degree for the arrangement shown in FIG. 3.

FIG. 4 shows the situation in which the image carrier element 3 and the projection lens are oriented substantially vertically (i.e. with their respective normal axes substantially horizontally). Linkage mechanism 7 is operated by means of rotation of a screw threaded actuation member 8 to cause a first linkage arm 11 to be drawn in the direction of arrow A. Arm 11 is connected to the upper portion of projection lens 4 and therefore as arm 11 moves in the direction of arrow A, lens 4 pivots about pivot axis 6.

Arm 11 is also pivotally connected to one limb of an "L" shaped actuator 12 which is pivotally mounted on a pivot post 13. The other limb of "L" shaped actuator 12 carries a pin which is received in a slot 15 provided in a boss end 14 of a second linkage arm 16. Second linkage arm 16 is connected to the upper edge of image carrier element 3 and is pulled in the direction of arrow B when first linkage arm 11 moves in the direction of arrow A. Appropriate selection of the lengths of respective limbs of "L" shaped actuator 12 and angular orientation of slot 15 in boss 14 ensures that, when the linkage mechanism 7 is actuated, image carrier element 3 and projection lens 4 are pivoted to the same angular extent.

Figure 6:
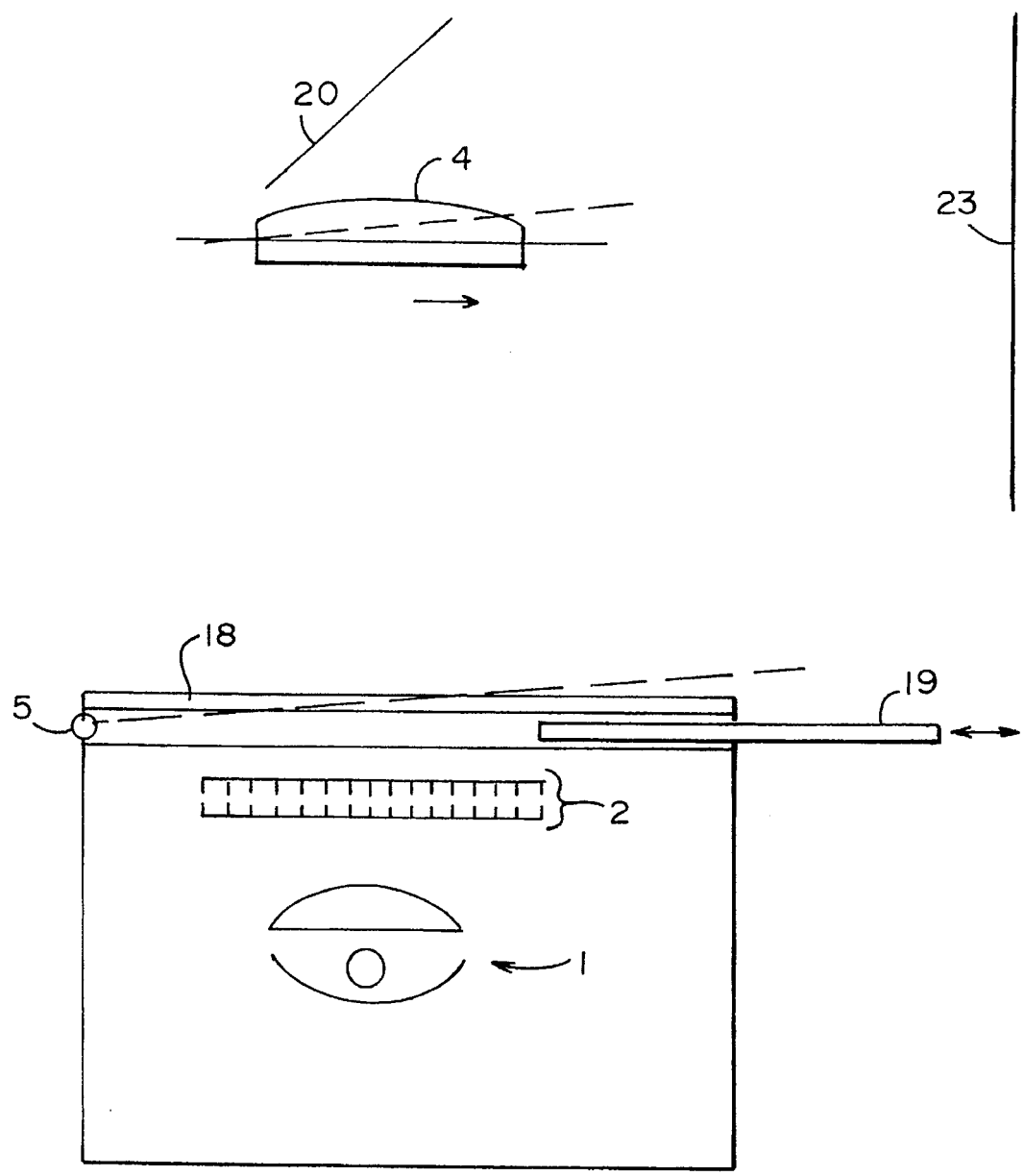
FIG. 6 is a schematic side elevation of a further embodiment of projection apparatus according to the invention.

Referring to FIG. 6 there is shown an arrangement of apparatus suitable for functioning as an overhead projection apparatus. In this arrangement the image carrier is effectively a transparent top 18 of the apparatus (of glass, for example) although, in a preferred embodiment a slidable LCD array 19 is provided which may be located contiguous with such a transparent top. In this arrangement, the Fresnel lens 2, the glass top 18 and/or the LCD array 19 are pivotable about pivot axis 5 as described above in unison with the projection lens 4. A mirror 20 is provided to direct the projected image onto screen 23.

Figure 7:
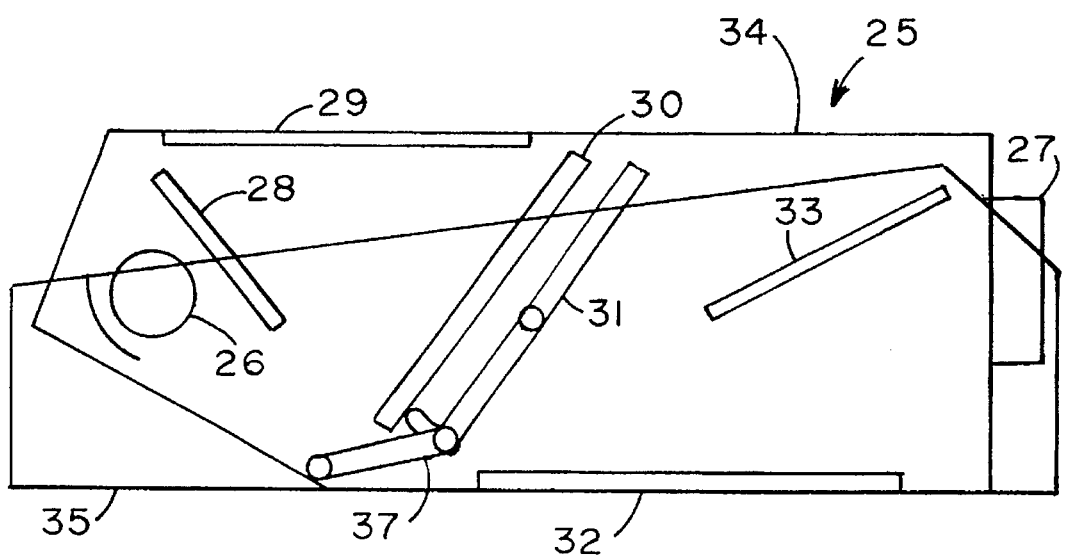
FIGS. 7 and 8 are schematic side elevations of a further embodiment of projection apparatus similar to that shown in FIGS. 1 to 5.
Figure 8:
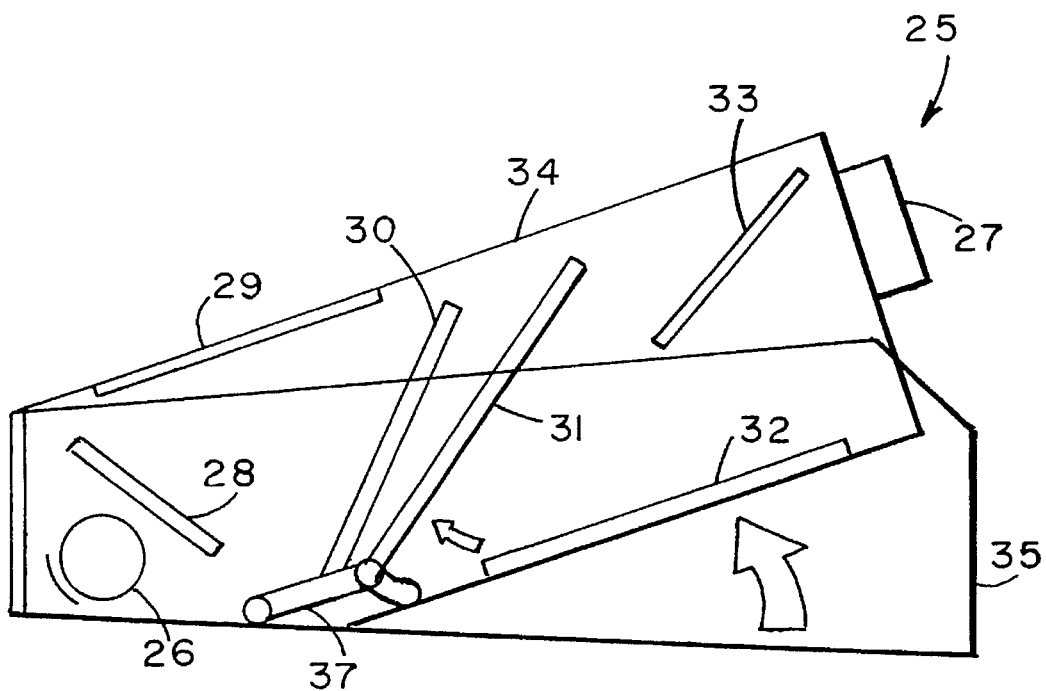

Referring to FIGS. 7 and 8, there is shown a preferred embodiment of projection apparatus 25 in which a light path exists through a main housing 34 from a light source 26, positioned toward the rear of the housing, to a tilting projection lens 27, positioned at the front of the housing via in sequence lens 28, mirror 29, Fresnel lens 30, image carrier element 31, and mirrors 32 and 33.

Main housing 34 is pivotally mounted toward the rear thereof to a datum mount comprising a container/base element 35 which in use rests on a support surface such as a table or the like. The main housing 34 is tiltable relative to the container/base element 35 between the positions shown in FIGS. 7 and 8. As main housing 34 and container/base element 35 tilt relative to one another, the action of linkage mechanism 37, connecting the container/base element 34 and the image carrier element 31, causes the image carrier element 31 to tilt by a corresponding amount relative to the main housing 34, thereby automatically adjusting the tilt attitude of image carrier element 31 relative to the main housing 34. As with previously described embodiments, the projection lens 27 is preferably connected to the image carrier element 31 by a linkage mechanism (not shown) such that as image carrier element 31 tilts automatically, projection lens 27 is caused to tilt automatically by a corresponding amount to ensure a high resolution, in focus rectangular image is produced on the screen. The container/base element 35 is arranged to provide an effective case in which, in a non tilted position (as shown in FIG. 7), the main housing 34 is conveniently stowed for portability.

Figure 9:
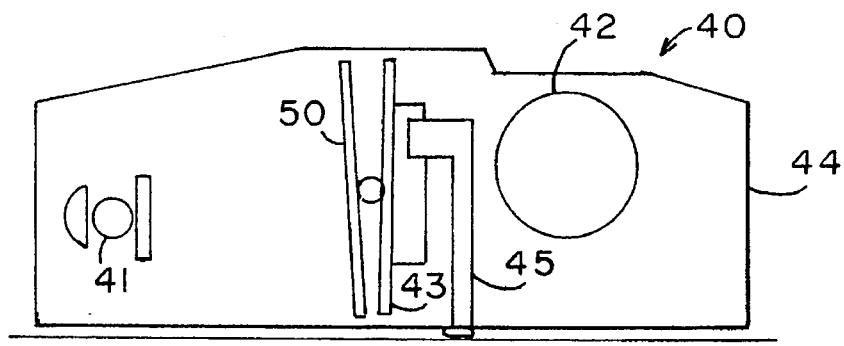
FIGS. 9 and 10 are schematic front elevations of a further embodiment of projection apparatus according to the invention.
Figure 10:
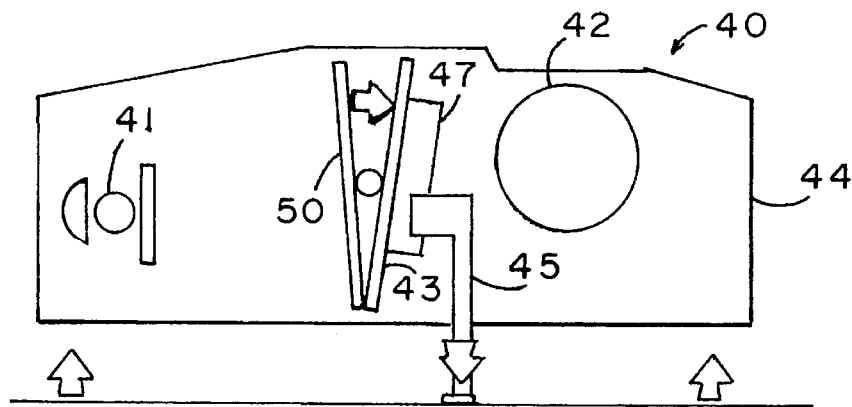
Figure 11:
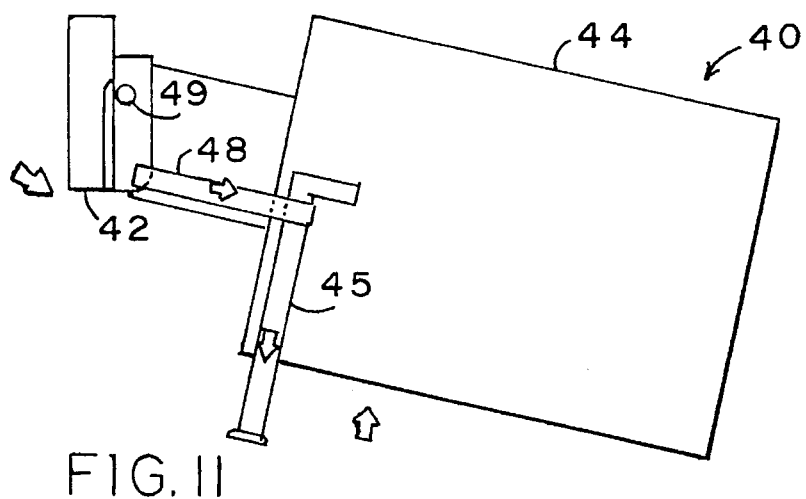
FIG. 11 is a schematic side elevation of the apparatus of FIGS. 9 and 10 in the projection position shown in FIG. 10.

Referring to FIGS. 9–11, there is shown an embodiment of apparatus 40 generally similar to the apparatus described in respect of FIG. 3, in that the light path from the light source 41 to the projection lens 42 is folded or bent at 90° through the image carrier element 43 (which retains an LCD array). Similarly to the embodiment of apparatus 25 described in relation to FIGS. 7 and 8, apparatus 40 is provided with a mechanism for automatically adjusting the tilt attitude of the image carrier element 43 when the projector housing is supported in its tilted position as shown in FIGS. 10 and 11. The Fresnel lens 50 remains fixed relative to the housing. The image carrier element 43 tilting mechanism comprises a support strut 45 which is extendible from the base of housing 44 to support the housing in the tilted projection position. The upper end of support strut 45 is slidably connected to a guide member 47 affixed to the image carrier element 43. As support strut 45 is moved from the stowed position (FIG. 9) to the extended support position (FIGS. 10 and 11 ), the attitude of image carrier element 43 is caused to tilt by an amount corresponding to the degree of tilting of the projector housing relative to the datum surface 46. The relative sliding connection between support strut 45 and guide member 47 causes the tilting of image carrier element 43. The guide member typically comprises an inclined guide formation (not shown) by which the connecting portion of strut 45 is constrained to slide. Apparatus 40 is further provided with a mechanism for automatically tilting the projection lens 42 by an amount corresponding to the degree of tilting of the image carrier element 43. The mechanism comprises an elongate strut 48 connected at one end to the tillable projector lens 42, and the other end being slidably connected to the support strut 45. As the support strut 45 moves to its extended supporting position, the sliding connection between struts 45 and 48 causes the projection lens to tilt by a predetermined extent (to the same extent as image carrier element 43) about pivot 49.

Projection apparatus as described can be used to project an image onto a screen such that the image is wholly above the level of the projection apparatus (which does not therefore obscure the view of observers directly to the mar of the apparatus), the "keystone" associated with conventional upwardly tilting projectors being eliminated or at least minimized.

I claim:

1. Projection apparatus comprising:

a base;

projector housing, tiltable relative to the base;

a projection lens carried by the housing arranged to project an image from the apparatus;

an image carrier element carried by the housing spaced from the projection lens and tiltable about a pivot axis;

a linkage connected between the base and the image carrier element, the linkage being arranged to cause automatic tilting of the image carrier element as the housing is tilted relative to the base.

2. Projection apparatus according to claim 1, wherein the image carrier element is arranged to be tilted forwardly in the direction of light propagation through the image carrier element.

3. Projection apparatus according to claim 1, wherein the projection lens is also aranged to be tilted.

4. Projection apparatus according to claim 3 wherein the projection lens is arranged to be tilted by an angular extent corresponding to the extent of tilting of the image carrier element.

5. Projection apparatus according to claim 3, wherein the projection lens and image carrier element are coupled relative to one another such that tilting movement of one causes corresponding tilting movement of the other.

6. Projection apparatus according to claim 5, comprising a linkage mechanism for coupling the image carrier element and projection lens.

7. Projection apparatus according to claim 1, comprising a field lens arranged to direct light from a source through the image carrier element.

8. Projection apparatus according to claim 7, wherein the field lens comprises a Fresnel lens.

9. Projection apparatus according to claim 8, wherein the orientation of the Fresnel lens is fixed.

10. Projection apparatus according to claim 1, wherein the image carrier element compriese an LCD image carrier element.

* * * * *